United States Patent
Maniscalco et al.

(10) Patent No.: US 8,366,371 B2
(45) Date of Patent: Feb. 5, 2013

(54) INDUSTRIAL BATTERY CHARGING, STORAGE AND HANDLING SYSTEM

(75) Inventors: Leonard J. Maniscalco, Oak Brook, IL (US); Paul R. Egger, Franklin Park, IL (US); Daniel J. Dwyer, Glen Ellyn, IL (US)

(73) Assignee: Sacket Material Handling Systems, Inc., Bensenville, IL (US)

( * ) Notice: Subject to any disclaimer, the term of this patent is extended or adjusted under 35 U.S.C. 154(b) by 1070 days.

(21) Appl. No.: 11/948,131

(22) Filed: Nov. 30, 2007

(65) Prior Publication Data
US 2009/0139940 A1  Jun. 4, 2009

(51) Int. Cl.
*B65G 1/00* (2006.01)

(52) U.S. Cl. .................... 414/279; 414/222.07; 104/34

(58) Field of Classification Search .................. 414/277, 414/286, 222.01, 222.03, 222.04, 222.05, 414/222.07, 222.08, 222.13, 266, 267, 268, 414/269, 278, 279, 281, 282, 287, 288; 320/109; 104/34
See application file for complete search history.

(56) References Cited

U.S. PATENT DOCUMENTS

| | | | | |
|---|---|---|---|---|
| 2,700,449 A * | 1/1955 | Gleason et al. | ............. | 198/464.3 |
| 3,724,699 A * | 4/1973 | Weston | ............. | 414/668 |
| 3,727,778 A * | 4/1973 | Hollenbach | ............. | 414/541 |
| 3,792,758 A * | 2/1974 | Wentz | ............. | 187/236 |
| 4,007,843 A * | 2/1977 | Lubbers et al. | ............. | 414/273 |
| 4,227,463 A * | 10/1980 | Pfleger | ............. | 104/34 |
| 4,450,400 A * | 5/1984 | Gwyn | ............. | 320/109 |
| 4,492,504 A * | 1/1985 | Hainsworth | ............. | 414/273 |
| 4,773,807 A * | 9/1988 | Kroll et al. | ............. | 414/282 |
| 4,894,764 A * | 1/1990 | Meyer et al. | ............. | 363/65 |
| 4,987,834 A * | 1/1991 | Peck et al. | ............. | 104/300 |
| 5,120,179 A * | 6/1992 | Henderson et al. | ............. | 414/278 |
| 5,187,423 A * | 2/1993 | Marton | ............. | 320/109 |
| 5,429,469 A * | 7/1995 | Zimek | ............. | 414/277 |
| 5,545,967 A * | 8/1996 | Osborne et al. | ............. | 320/109 |
| 5,549,443 A * | 8/1996 | Hammerslag | ............. | 414/809 |
| 5,582,497 A * | 12/1996 | Noguchi | ............. | 414/281 |
| 5,599,154 A * | 2/1997 | Holscher et al. | ............. | 414/278 |
| 5,612,606 A * | 3/1997 | Guimarin et al. | ............. | 320/109 |
| 6,094,028 A * | 7/2000 | Gu et al. | ............. | 320/109 |
| 6,364,922 B1 * | 4/2002 | Tanaka et al. | ............. | 55/385.1 |
| 2006/0058912 A1 * | 3/2006 | Karlen | ............. | 700/214 |

OTHER PUBLICATIONS

HK Systems Supply Chain Solutions Material Handling Equipment "HK3000/RD Rotating Fork Storage & Retrieval Machine", 2003, 2pp.

* cited by examiner

*Primary Examiner* — Saul Rodriguez
*Assistant Examiner* — Glenn Myers
(74) *Attorney, Agent, or Firm* — Banner & Witcoff, Ltd.

(57) ABSTRACT

A battery movement, storage, and charging system for large size batteries used in lift trucks includes spaced, parallel storage racks, each of which have multiple storage and charging bays. A battery transport tower is positioned in an aisle between the storage racks and is moveable horizontally between the two rows of racks. The tower includes an extendable fork lift mounted which may rotate around the axis of the tower as well as move vertically upwardly or downwardly on the tower. A battery exchanger loads a discharged battery from a lift truck, places it on a pallet and then transfers the pallet and battery to a transfer bay in a storage rack where the tower forklift moves a pallet and battery to a selected charging bay.

21 Claims, 16 Drawing Sheets

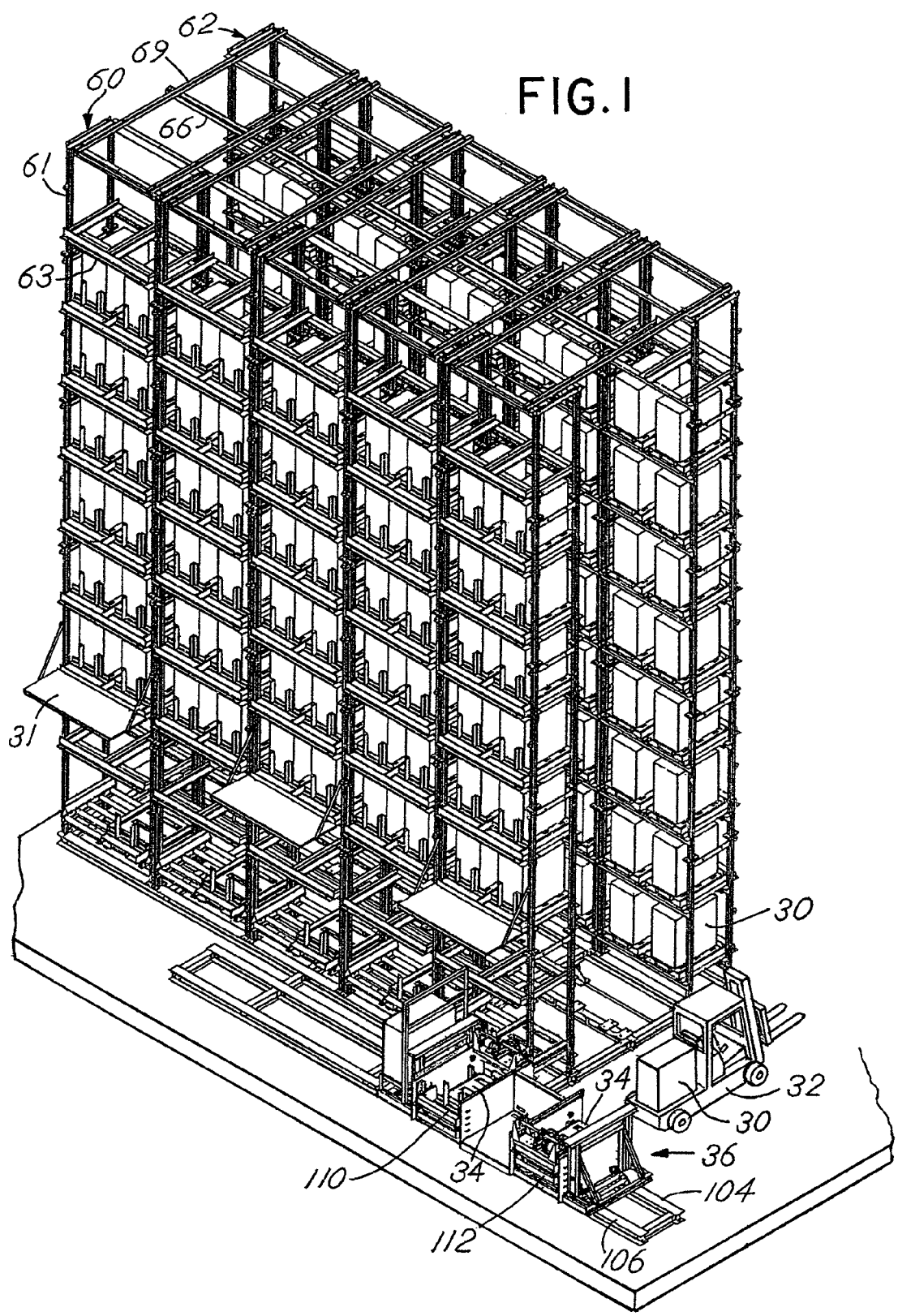

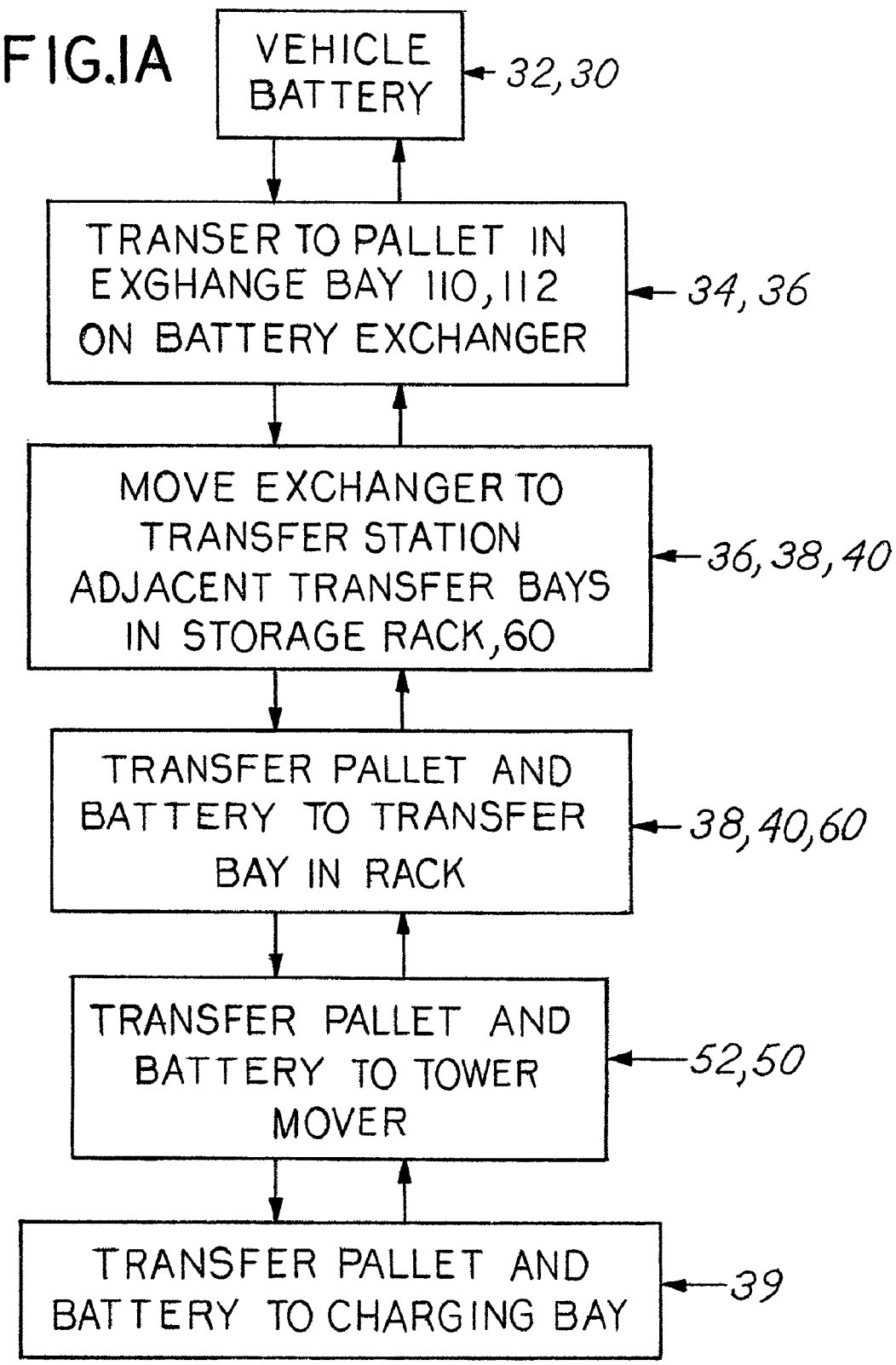

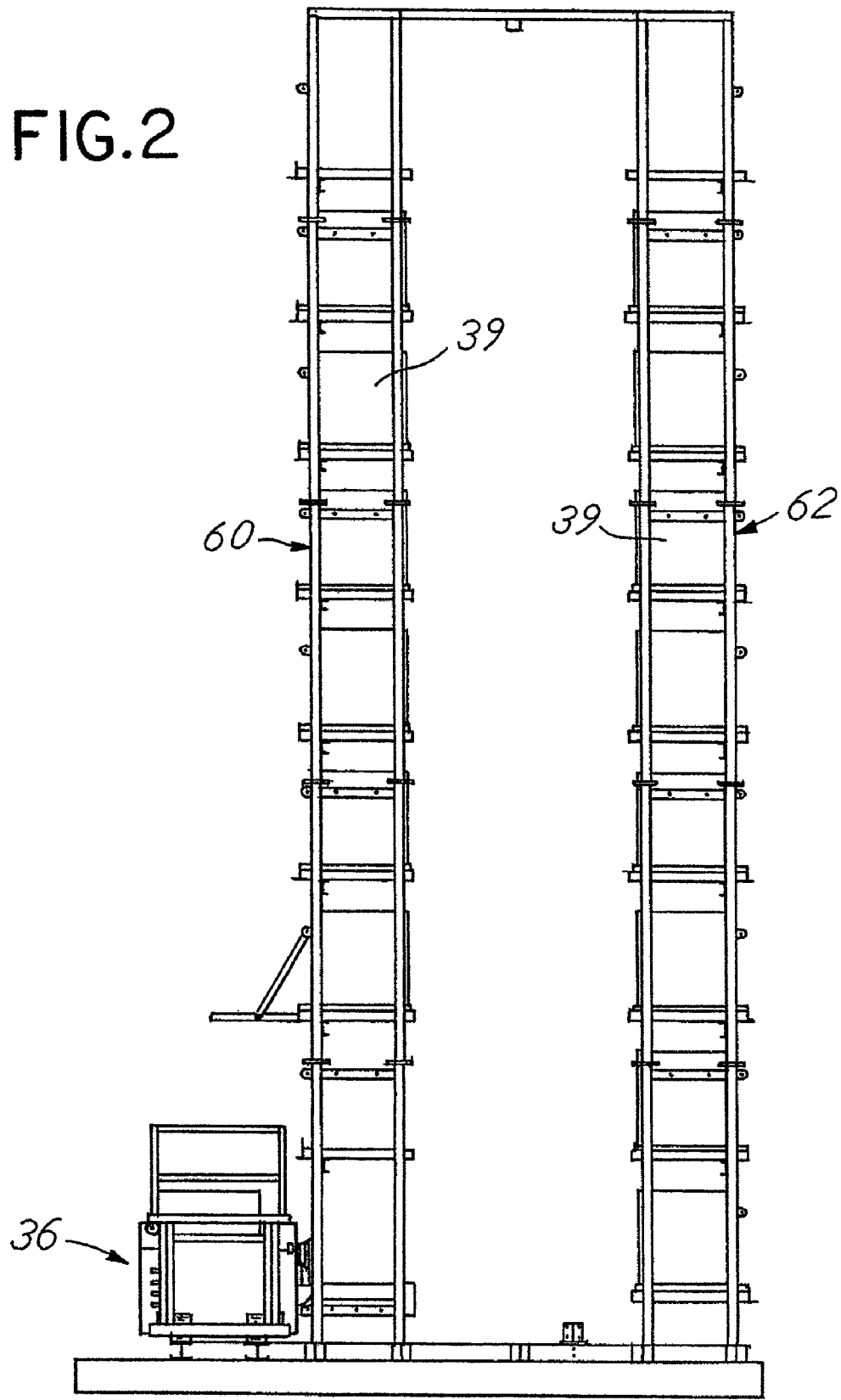

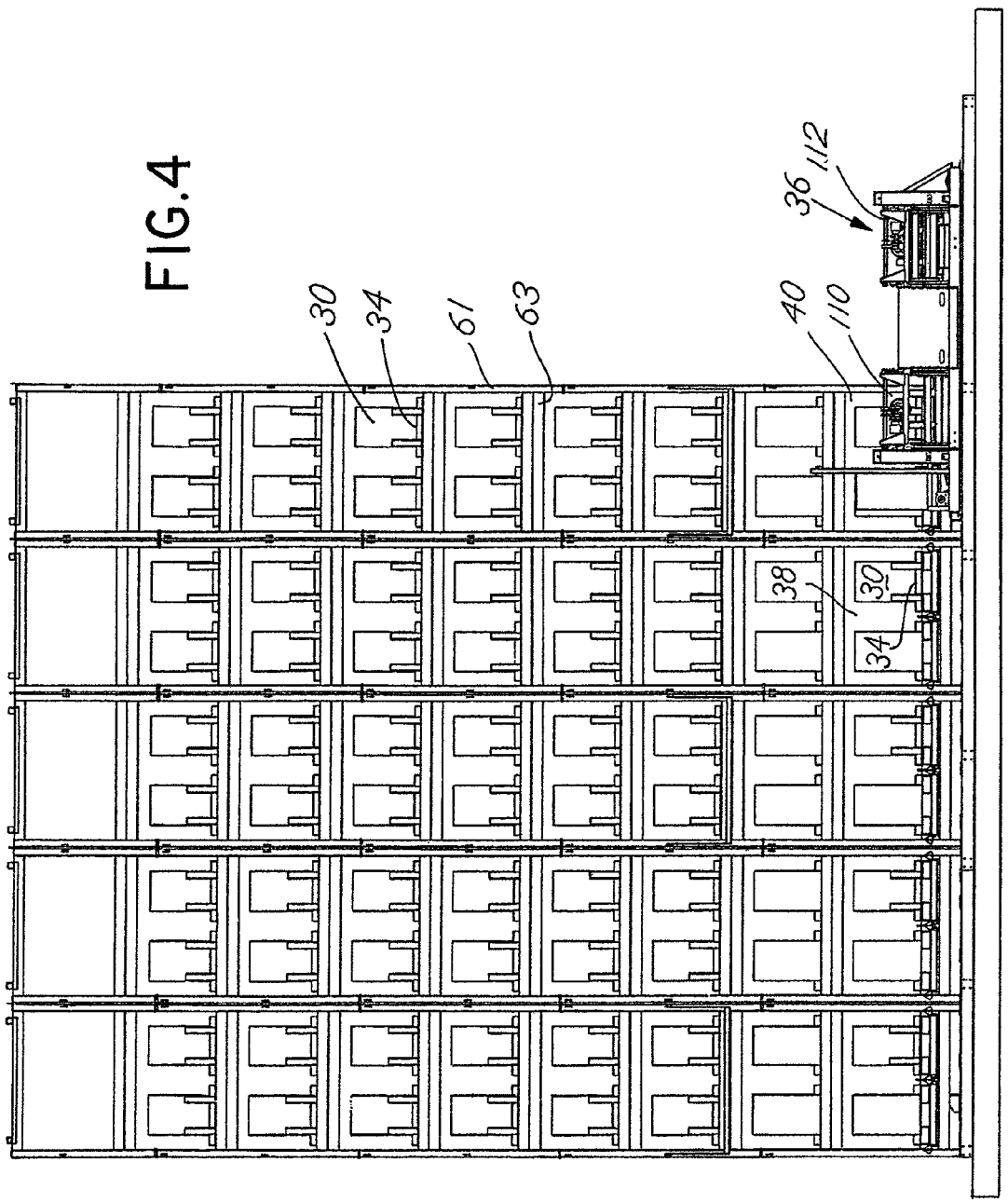

FIG.4C
FIG.4D
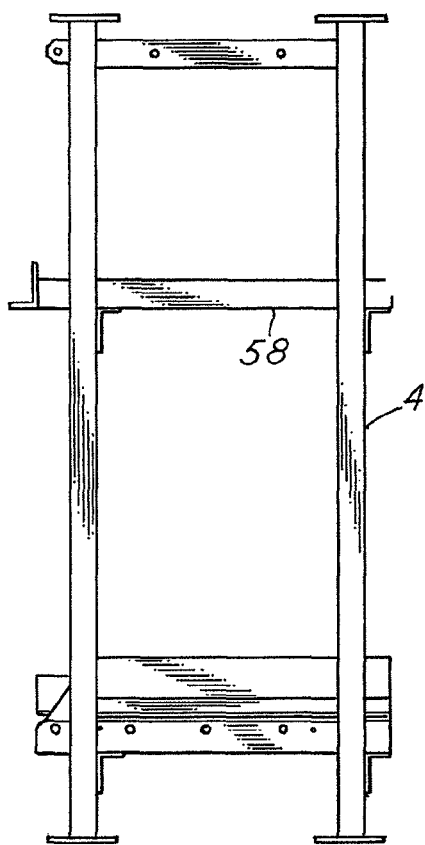
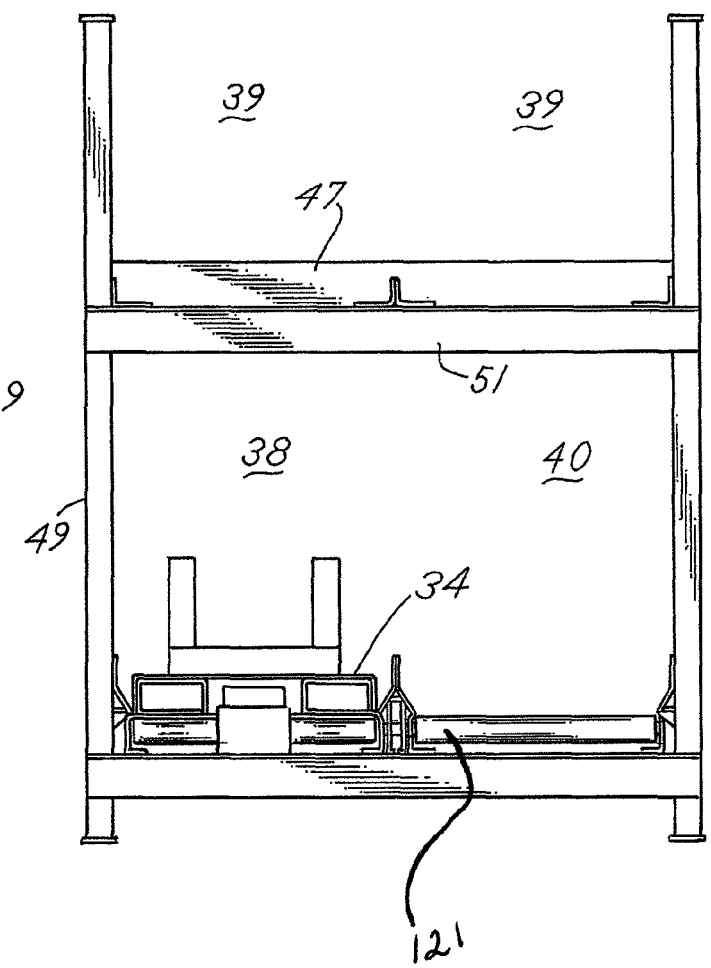

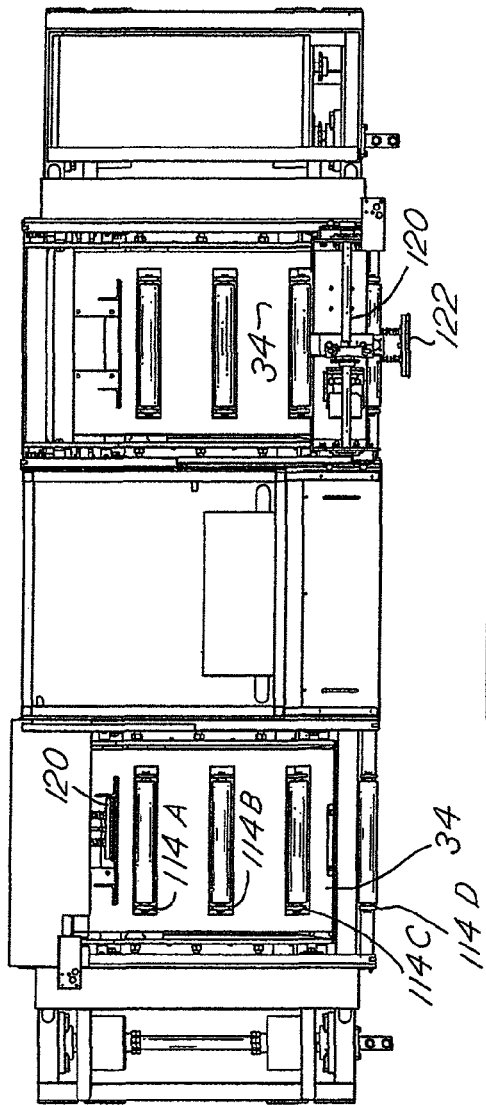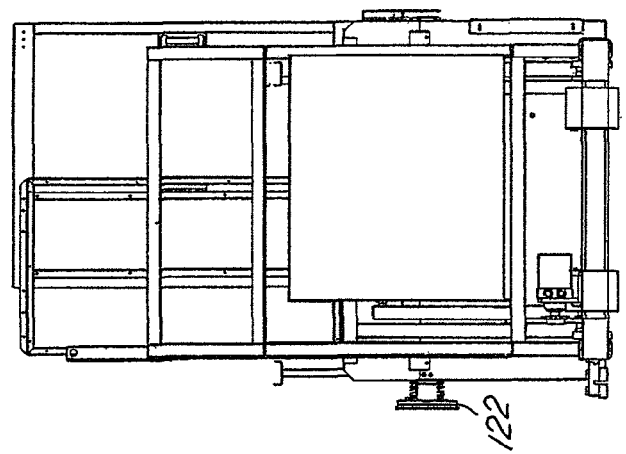

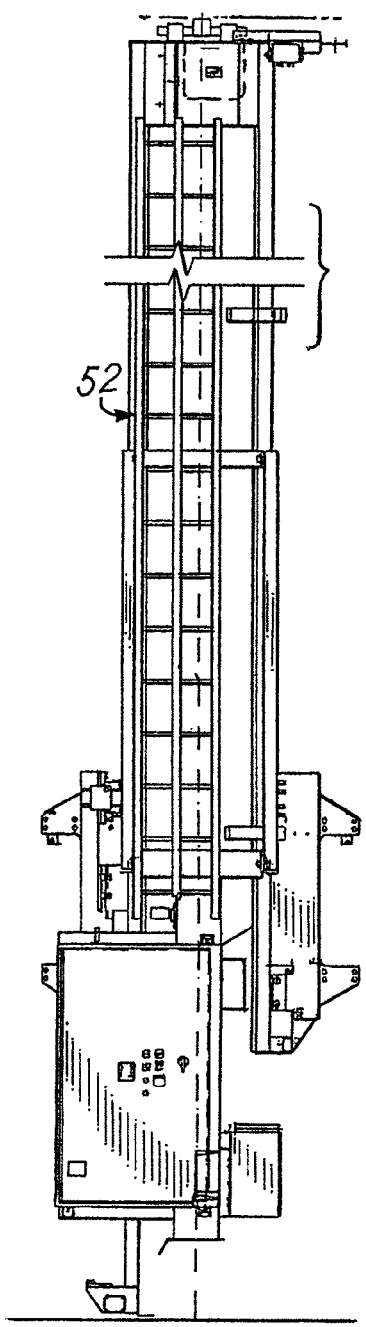
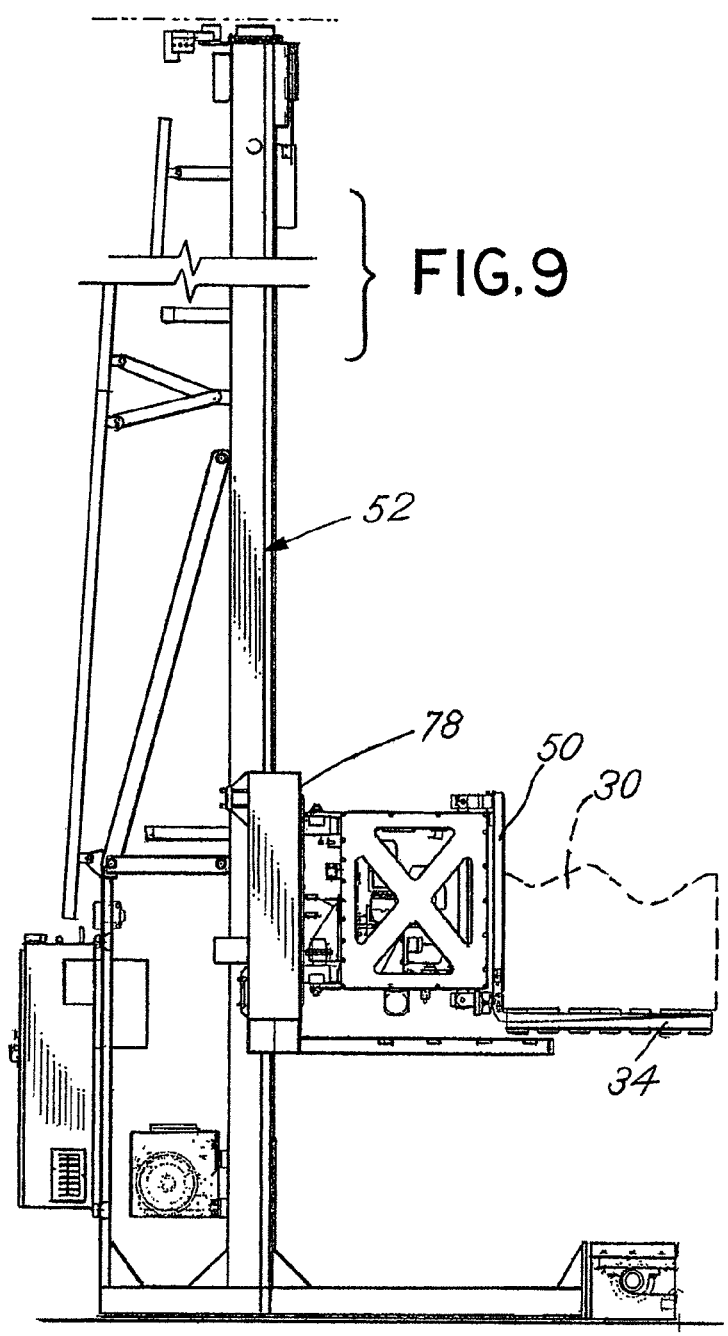
FIG. 8
FIG. 9

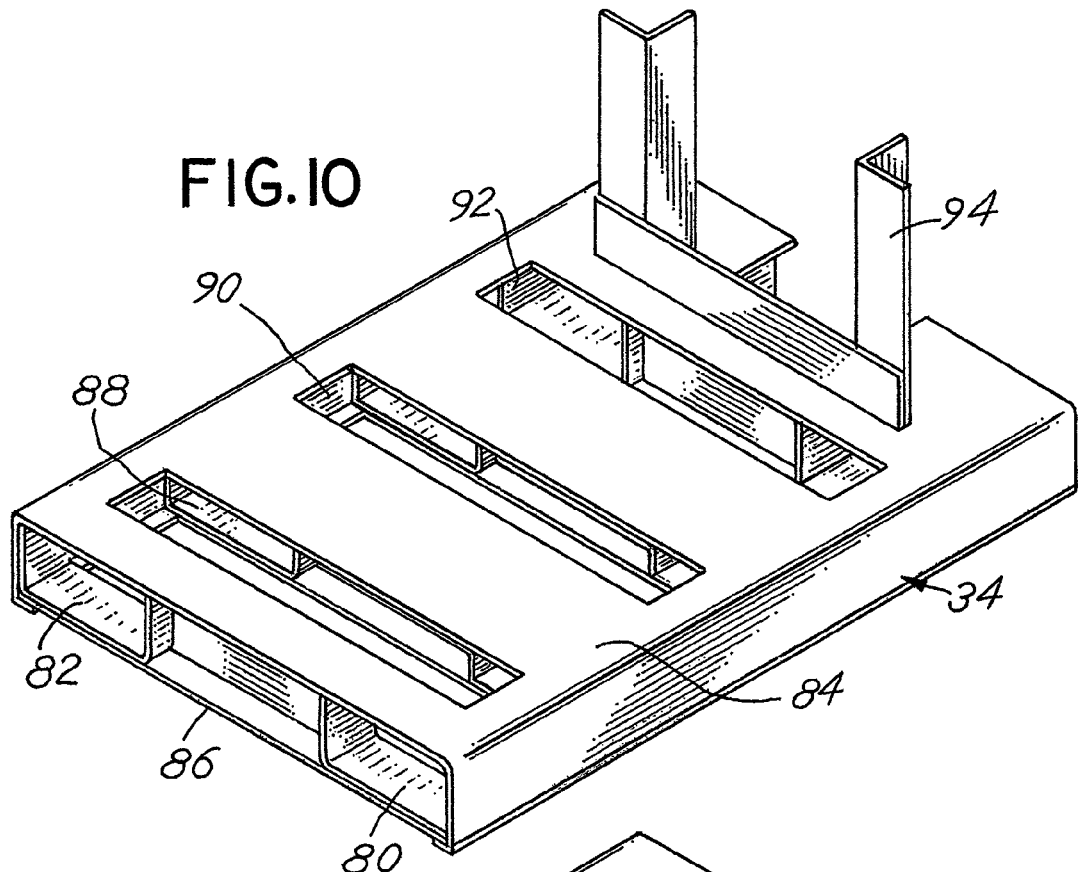
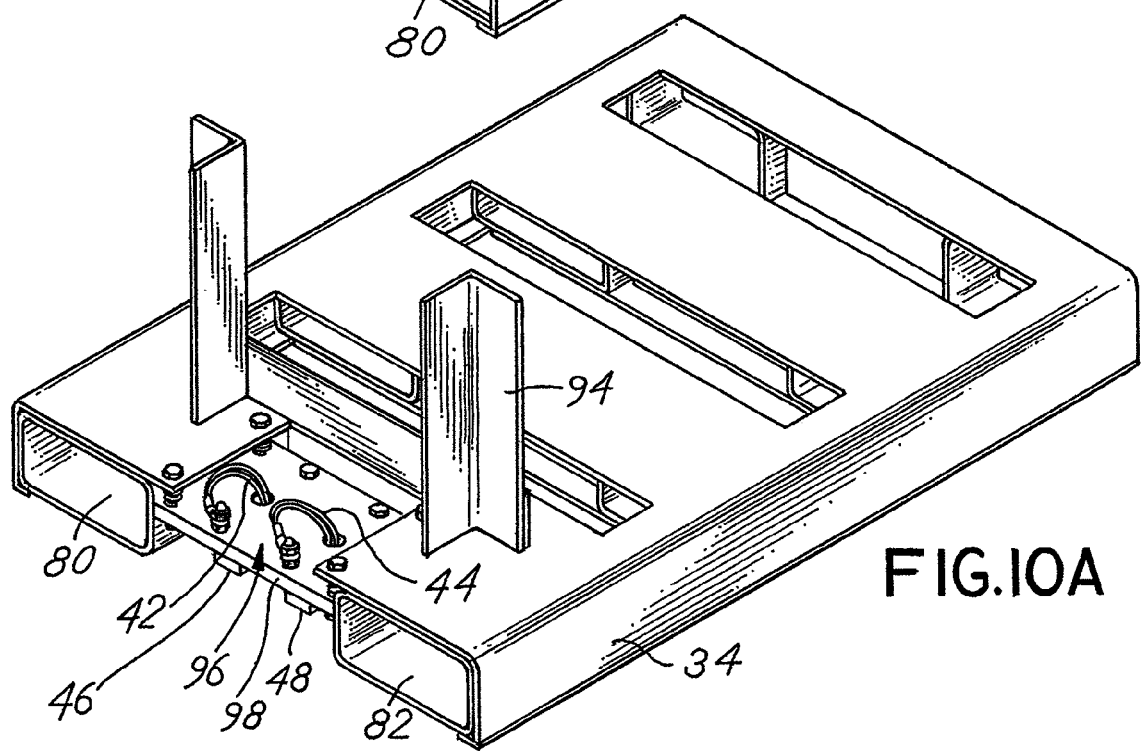

INDUSTRIAL BATTERY CHARGING, STORAGE AND HANDLING SYSTEM

BACKGROUND OF THE INVENTION

In a principal aspect, the present invention relates to a system for the movement, storage and charging of commercially sized batteries including their placement into and removal from lift trucks or other battery powered vehicles and devices. The storage system may also be utilized for warehousing large or bulky items such as containers for goods, large sized products and other items capable of being placed on a pallet.

Lift trucks and similar devices used in an industrial capacity to move parts and inventory in a manufacturing or storage facility are often battery powered. Batteries of the nature incorporated in such trucks are large, bulky and may weigh more than 1,000 pounds.

In order to maintain an efficient lift truck operation, it is generally necessary to store and charge spare batteries. There are various protocols and systems for the storage, charging, and the handling of industrial or commercial sized batteries. Often, heavy lifting machinery is utilized to move batteries into storage racks or battery charging rooms. The racks or rooms are often termed "charging stations" and have certain requirements relating to temperature, ventilation and the like. That is, when a lead acid battery is charged, oxygen and hydrogen gas are generated during the process. Adequate ventilation is, thus, a necessity and the design of charge equipment and systems must take into account such a requirement.

Additionally, it is desirable to make sure that the storage and handling of such batteries is done efficiently in the context of the space required, the safety of the individuals involved in the operation, and access to adequate controls with respect to the safe handling of such items. Such an operation also requires around the clock capability and preferably a system where storage, charging and retrieval of the batteries is automated. Thus, the safe and efficient handling of such batteries is an especially challenging operation, particularly in an industrial setting such as a warehouse or factory.

SUMMARY OF THE INVENTION

Briefly, the present invention comprises a battery movement, storage, and charging system for large size batteries used in lift trucks and the like. The system is comprised of a series of storage racks, each of which defines multiple storage bays. Each rack is comprised of a matrix or series of horizontal and vertical rows of storage compartments, each compartment including one or more bays, each bay being capable of storage and charging of a battery. In one embodiment of the invention, first and second storage racks are arrayed in parallel with an aisle therebetween. A battery transport tower is positioned in the aisle between the storage racks. The transport tower is designed to move horizontally between the two parallel rows of racks. The tower includes an extendable fork lift mounted thereon which may rotate vertically around the tower as well as move vertically upwardly or downwardly on the tower. Thus, all the bays of the storage racks are accessible to the fork lift which may move horizontally and vertically between the bays of the parallel array of storage racks, as well as into and out of the bays.

An important feature of the invention is the utilization of a separate battery support pallet for each battery. Each support pallet is configured to fit within a storage and charging bay and to support a single battery on the pallet in that storage bay. Each pallet includes integral, conductive brushes that are designed to electrically engage charging contacts incorporated in each bay upon placement of the pallet in the storage and charging bay. The conductive brushes are electrically connected to leads which may be attached to the poles of a battery supported on the pallet. The battery loaded pallets are designed to be easily handled and moved by the fork lift and associated tower into and out of the bays of the parallel, spaced storage racks.

The array of charging and storage bays is augmented by at least two transfer bays, in most instances, located in the lowermost horizontal row of compartments of one of the parallel storage racks. The transfer bays are designed to receive a charged battery from a storage bay as delivered by the tower forklift and also to receive discharged batteries removed from a lift truck by a battery exchanger. Thus, a battery exchanger is provided to remove a discharged battery from a lift truck, place the battery on a pallet, and then transport the battery laden pallet to a transfer bay. The battery exchanger is typically mounted on a track and is movable between a first station where the transfer bays are located, and a second station for loading charged batteries into a lift truck, or for removing discharged batteries from a lift truck.

The pallet which supports a battery, whether charged or discharged, supports a single battery. The pallet and battery are thus moveable from a storage bay to a transfer bay, then from a transfer bay to a battery exchanger, and then from the battery exchanger to a lift truck where the battery is removed from the pallet and installed in the lift truck. The system also enables the reverse sequence of steps. In other words, a battery from a lift truck is moved at the second station onto a pallet in an exchange bay of the battery exchanger. Then the exchanger moves to align the exchange bay with a transfer bay at the first station and transfers the pallet and battery from the exchange bay to a transfer bay; the battery and pallet then are moved to a charging and storage bay by means of the forklift and the tower. The forklift on the tower thus moves pallets to and from the transfer bays into and out of charging and storage bays. The battery exchanger moves batteries onto pallets or off of pallets from or to lift trucks, and also moves pallets with batteries thereon into or out of the transfer bays.

A highly desired feature of the invention is the utilization of a program controller which automatically programs the battery movement and charging sequence to insure that the movement of batteries, both charged and discharged, occurs in an efficient manner. Since there are two exchange bays in a desired embodiment of the battery exchanger, whenever a discharged battery is removed from a lift truck, and placed in one of the ex change bays, the battery exchanger may hold a charged in the other exchange bay for installation in the lift truck. Thus the battery exchanger initially moves along its pathway on rails to align an empty exchange bay thereof having an empty pallet therein with the lift truck having a discharged battery. The battery exchanger includes a gripping mechanism in each exchange bay for removing or transporting the discharged battery from the lift truck vehicle onto the empty pallet in the exchange bay. The battery exchanger may then move to align a separate second exchange bay, having a charged battery mounted or supported on a pallet, with the lift truck vehicle which requires a charged battery. The battery exchanger's gripping mechanism then moves the charged battery from the pallet and onto the lift truck vehicle where it may be connected to the lift truck circuitry.

The battery exchanger having one empty exchange bay and one exchange bay with a discharged battery on a pallet will then move from the second or lift truck station to the first or transfer bay station. Upon arrival at the transfer bay station, the discharged battery supported on a pallet will be moved by the gripping mechanism from the exchange bay into an empty transfer bay in the storage rack. The tower forklift mechanism may then move the discharged battery on its pallet to a charging bay in a rack where the brushes engage charge contacts, and the battery is charged.

The entire operation is efficiently controlled by a program controller, so that typically the first battery placed into a charging and storage bay will then be the first battery taken out upon being charged and so that when a charged battery is placed in a lift truck, a discharged battery will be placed in an empty storage bay to initiate charging thereof.

Thus, it is an object of the invention to provide an improved battery storage, charging and handling system.

Another object of the invention is to provide a battery storage and handling system which enables the handling of large sized batteries and charging such batteries in an efficient and programmed manner.

A further object of the invention is to provide a battery charging, storage and handling system which includes multiple rows of storage and charging bays in combination with transfer bays, a battery exchanger and battery support pallets.

Another object of the invention is to provide an inexpensive yet highly efficient and economical way to store, charge, and handle large size batteries of the type used for lift trucks.

Yet a future object of the invention is to provide an automated system for movement of bulky items from a station to a storage rack wherein such transfer is made by placement of each item on a pallet; at the station, movement of the pallet by means of an exchanger to a transfer bay in the storage rack and subsequent movement of the pallet from the transfer bay to a storage bay.

These and other objects, advantages, and features of the invention will be set forth in a detailed description which follows.

BRIEF DESCRIPTION OF THE DRAWING

In the detailed description which follows reference will be made to the drawing comprised of the following figures:

FIG. 1 is an isometric view of an embodiment of the battery handling system of the invention;

FIG. 1A is a flow diagram illustrating the method of material handling employed by the embodiment of FIG. 1.

FIG. 2 is an end elevation of the system of FIG. 1 viewed from the end on the right hand side of FIG. 1;

FIG. 4 is a front side elevation of the system of FIG. 1;

FIG. 4C is a side elevation of the rack of FIG. 4B;

FIG. 4D is a front elevation of the rack of FIG. 4B;

FIG. 5B is a top plan view of the battery exchanger of FIG. 5;

FIG. 5C is a front side elevation of the battery exchanger of FIG. 5;

FIG. 5D is a side elevation of the battery exchanger of FIG. 5;

FIG. 8 is a side elevation of the center tower system depicted in partial views 7A, 7B and 7C;

FIG. 9 is a further side elevation of the tower construction of FIG. 8;

FIG. 10 is an isometric view of a pallet construction used in combination with the system of the invention;

FIG. 10A is an isometric view from the opposite side of the pallet of FIG. 10;

DESCRIPTION OF AN EMBODIMENT OF THE INVENTION

Figure 3:
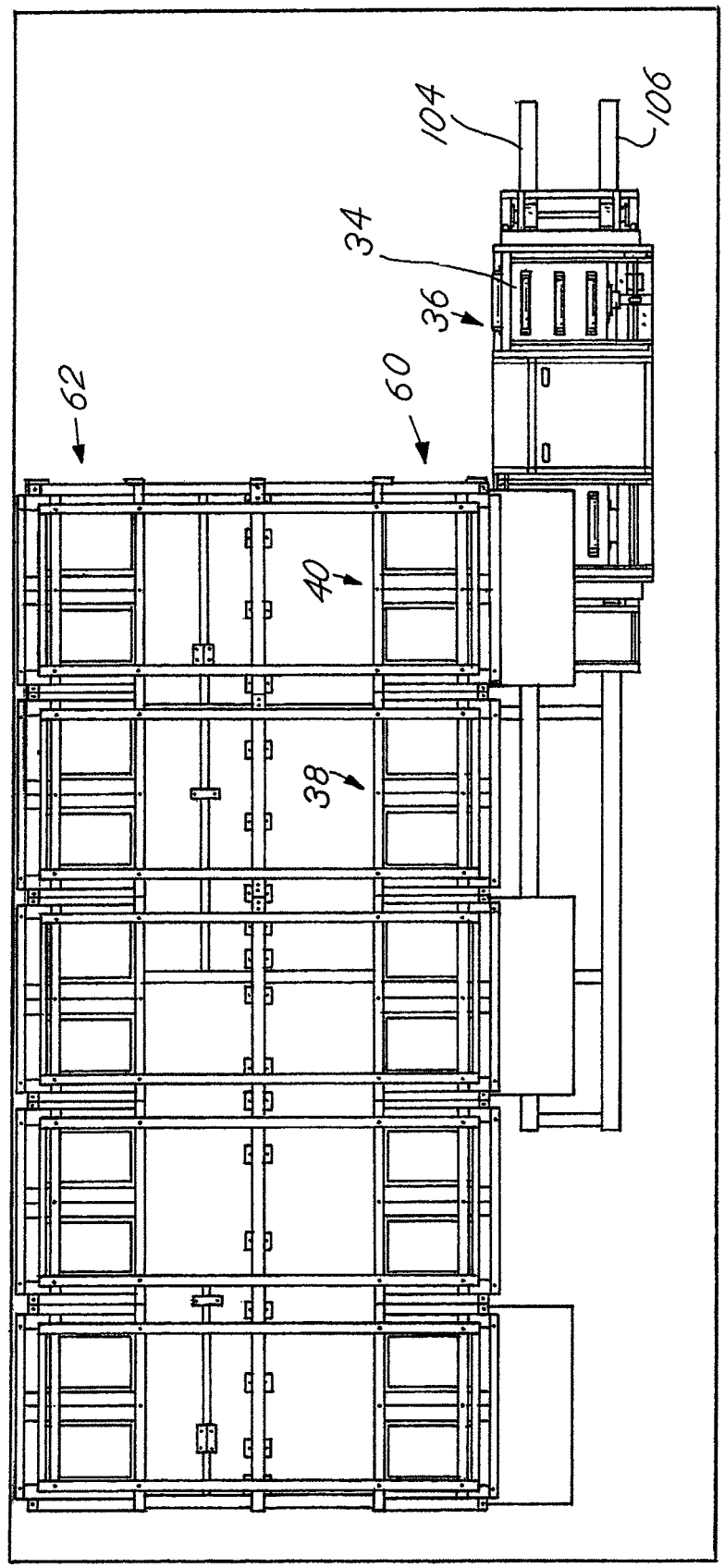
FIG. 3 is a top plan view of the system of FIG. 1.

The battery handling, storage and charging system is employed to receive industrial sized batteries from a lift-truck or other battery powered device. The batteries are placed within the system and stored in the system for purposes of charging. Upon charging of the batteries, they may be removed from the storage system and placed or installed in a battery operated vehicle or device by means of the system.

General Description of System

The system as depicted in the FIGS. 1-4 comprises at least a pair of storage racks 60, 62 having multiple charging bays 39. The bays 39 are arranged in vertical and horizontal rows. Typically, the system is comprised of at least first and second parallel or aligned, separate racks 60, 62 of storage bays 39 with an intermediate space or aisle therebetween. A transport tower 52 is situated in the aisle or space between the storage racks 60, 62. The transport tower 52 includes an extendable forklift 50 designed to engage and support a pallet 34 with a battery 30 thereon and transport the pallet 34 with a battery 30 thereon to or from any one of the multiple bays 39 defined by the array of storage racks 60, 62. The transport tower 52 thus comprises a vertical tower which is guided by a horizontal track 64 at floor level of the storage assembly and a parallel top rail 66 at the top of the tower 52 so that the transport tower 52 may move in a horizontal pathway between the storage racks 60, 62. The transport tower 52 includes an extendable forklift 50 mounted on an elevator or carriage mechanism 78 designed to engage, support and transport the forklift forks 70, 72 having a battery and pallet 34 thereon and move a pallet 34 vertically upwardly and downwardly along the height of the tower 52, as well as pivot the pallet 34 about the vertical axis of the tower 52. Thus the tower 52 may be positioned adjacent a bay 39 and the forklift 50 extended or retracted to place a pallet 34 into or remove a pallet 34 from any of the storage bays 39 defined by the parallel storage racks 60, 62 as well as into or out of transfer bays 38, 40 located along the bottom of a rack 60.

A battery exchanger 36 is positioned generally parallel to and along a backside of rack 60. The exchanger 36 moves on rails 104, 106 between a first station adjacent to transfer bays 38, 40 of rack 60 where exchange bays 110, 112 of exchanger 36 are located, and a second station for receipt or delivery of a battery 30 to a vehicle 32 such as a lift truck 32. A discharged battery is thus moved from a lift truck 32 onto a pallet 34 in an exchange bay 112 of exchanger 36. The second exchange bay 110 may then be aligned with the lift truck and a charged battery from that bay 110 placed in the vehicle 32. Then a pallet 34 in exchanger 36 may be moved to the first station opposite a transfer bay 38, 40 in rack 60. Whereupon the discharged battery 30 on pallet 34 in exchange bay 112 is moved to transfer bay 40 and thence by forklift 50 and tower 52 to a charging and storage bay 39.

Figure 10B:
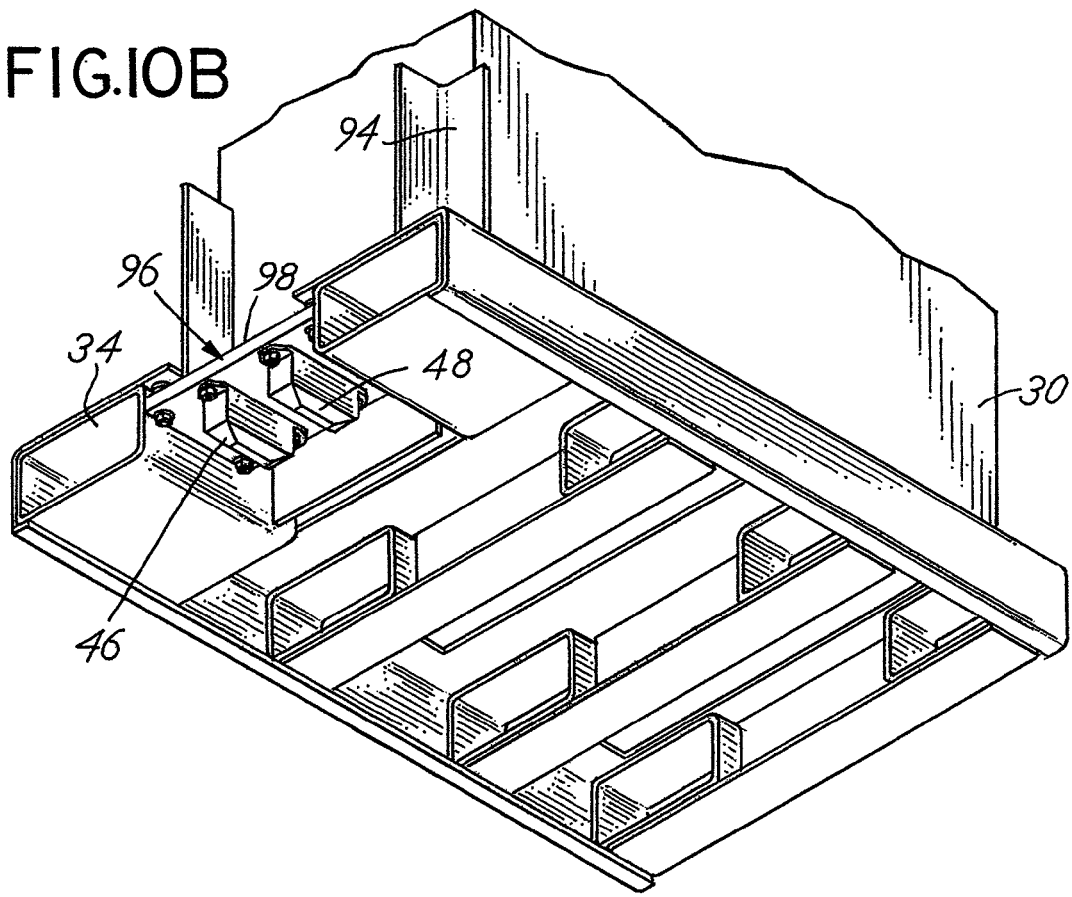
FIG. 10B is an isometric view of the pallet of FIG. 10 as viewed from the underside thereof.
Figure 10C:
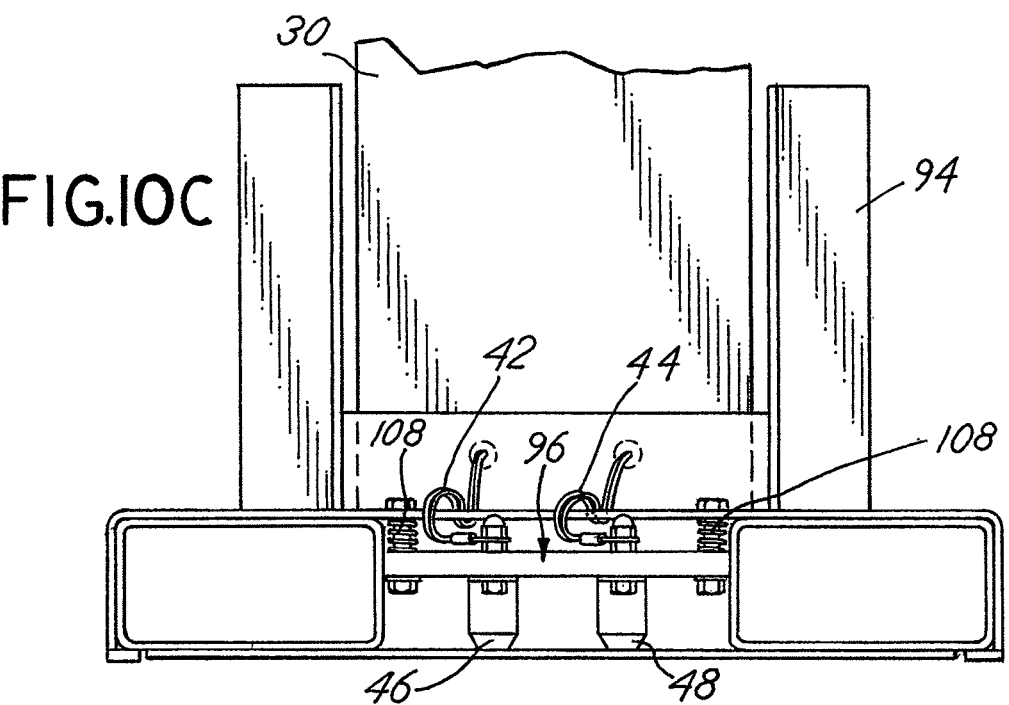
FIG. 10C is an end view of the pallet of FIG. 10.

Referring to Flow Diagram FIG. 1A, battery 30 is typically mounted, or installed in a battery driven vehicle 32 such as a lift truck. When the battery 30 is discharged, the battery 30 is removed from the vehicle 32 and placed upon a pallet 34 (FIGS. 10-10C). Placement upon the pallet 34 typically occurs at or near a ground or low level station where a battery exchanger 36 effects the removal of the uncharged battery 30 from the battery powered vehicle 32 and placement of that battery 30 upon the pallet 34 located in one exchange bay 110 or 112 in the exchanger 36. The pallet 34 is then transported by the battery exchanger 36 to a position or station adjacent a battery transfer bay 38 or 40 in storage rack 60. At that station, the battery 30 mounted on the pallet 34 is moved from the exchange bay 110 or 112 and positioned within a transfer bay 38 or 40. The transfer bays 38, 40 are located in a storage rack 60.

Next, an extendable forklift 50 mounted on a moveable tower 52 adjacent rack 60 extends forks 70 72 to engage and lift the pallet 34 with battery 30 thereon and transports them to a storage and charging bay 39 in the rack 60 or a parallel rack 62. Upon placement or positioning within a storage bay 39, the battery 30, which is connected to leads 42, 44 attached to the pallet 34, is positioned in a manner whereby electric brushes 46, 48 of the pallet 34 are engaged with bay charging contacts 54, 56, so that the battery 30 stored upon the pallet 34 will be charged as it resides in a particular bay 39 within storage rack 60 or rack 62. Thus the battery 30 is transported from the vehicle 32 by means of a battery exchanger 36 and tower 52 into a particular bay 39 within a storage rack 60, 62 where it is charged.

Subsequently upon charging, the battery 30 on pallet 34 may be retrieved by extendable forklift 50 of tower 52. The charged battery 30 is then placed in a battery transfer bay (e.g. 38). The battery exchanger 36 then moves battery 30 on pallet 34 into an exchange bay 110 or 112 of the exchanger 36. The battery exchanger 36 next transports the battery 30 on pallet 34 to a vehicle station where the battery 30 may be removed from the pallet 34 located in the exchange bay 110 or 112 and placed within the battery operated vehicle 32.

The Rack Assembly

Referring to FIGS. 1 through 4D, the system includes a first storage rack 60 and a second storage rack 62. The first rack 60 is comprised of metal girders which define a grid of compartments including one or more storage bays 39. Vertical girders 61 are combined with horizontal girders 63 and cross braces 65 to provide the gridwork of bays 39. The bays 39 are arrayed in horizontal and vertical rows. The bays 39 are constructed and sized to receive and store at least one pallet 34 upon which a battery 30 is supported. Each storage bay 39 includes battery contacts 54, 56 that connect with brushes 46, 48 mounted on the base of each pallet 34 that, in turn, are connected to appropriate leads 42, 44 that connect to the battery poles of a battery 30 for charging of a battery 30 mounted on a pallet 34 in a bay 39. Each of the racks 60 and 62 is constructed in substantially the same manner.

In the embodiment depicted the first rack 60 is utilized with an associated battery exchanger 36 located at ground level which is designed to receive uncharged batteries 30 from a vehicle 32 as well as to place a battery 30 within a vehicle 32 from which an uncharged battery 30 has been removed. The battery exchanger 36 is thus designed to move in a horizontal pathway generally parallel to the rack 60 and in alignment with the rack 60 along a side of the rack 60 where it has access to transfer bays 38, 40 in rack 60.

Thus the first storage rack 60 and the second storage rack 62 comprise a series of generally rectangular parallelepiped bays 39 within a compartment. Each compartment is typically constructed to store two batteries 30 and thus defines two bays 39. Each bay 39 may is designed to hold one battery 30. Each bay 39 provides a floor or support for a pallet 34 that is placed therein. Each bay 39 also includes charge plates or contacts 54, 56 to connect with brushes 46, 48 associated with a pallet 34 to enable for direct current charging of the battery 30 stored on pallet 34 within the bay 39. The racks 60 and 62 are typically of the same size and configuration, including the same width. However, racks 60, 62 and bays 39 may be custom designed to accommodate batteries and pallets of various sizes and types. The racks 60, 62 also include support platforms such as platform 31 for supporting a rectifier (not shown) having leads to the contacts 54, 56.

Figure 4A:
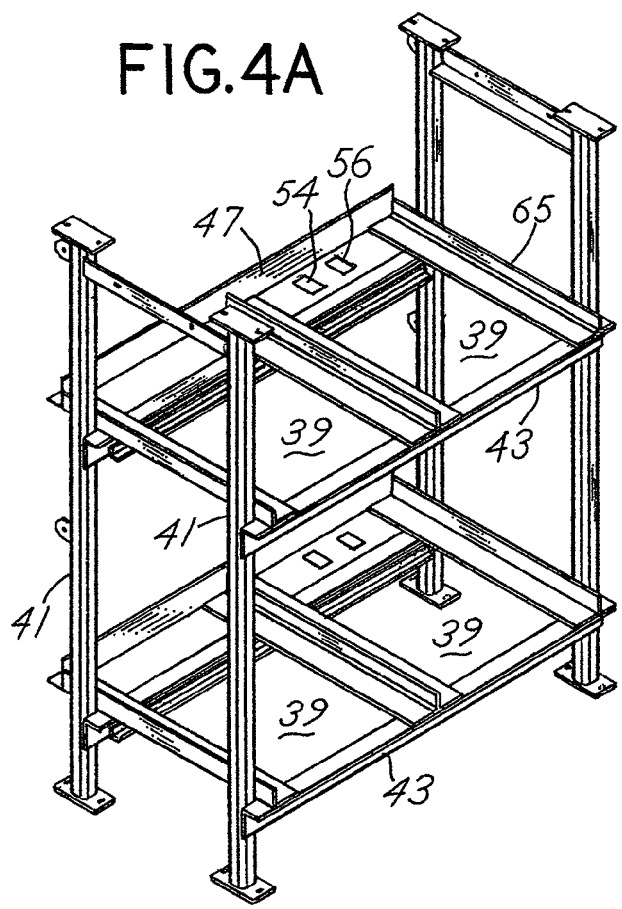
FIG. 4A is an isometric view of a modular or component part of storage racks depicting a modular section of such racks.
Figure 4B:
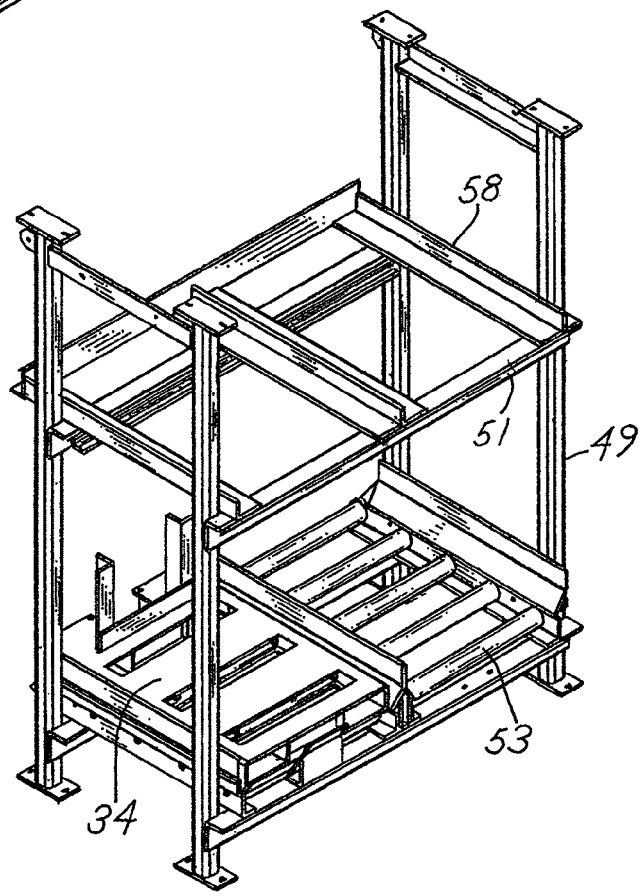
FIG. 4B is an isometric view of a modular transfer rack station which is incorporated in the storage racks such as depicted in FIG. 1.

FIGS. 4A and 4B illustrate modular components for assembly of the storage racks 60, 62. Referring first to FIG. 4A, there is depicted a modular component section of the storage rack 60, 62 which receives and stores batteries on pallets 34. Each pallet 34 is designed to hold or support a single battery 30 as discussed hereinafter and to fit in a single bay 39. A modular storage rack component section is comprised of vertical beams 41 connected by horizontal beams 43 and cross brace members 65 which are appropriately spaced and configured to provide bays 39 that support and retain a pallet 34. The construction depicted in FIG. 4A is thus designed to receive four pallets. The cross members or cross brace members 65 are spaced the depth of the racks 60, 62. A backside stop member 47 is provided to limit the movement of a pallet 34 onto the horizontal beams 43. The cross braces 65 thus slidably receive a pallet from the front side of a rack 60, 62. The cross braces 65 have an L-shaped cross section to prevent the pallets 34 from sliding side to side upon insertion into a bay 39. Since the storage racks 60, 62 are principally made up of modular sections of the component parts illustrated in FIG. 4A, the horizontal beams 43 are connectable to form the horizontal girders 63 of racks 60, 62. Vertical beams 41 are connected to form the vertical girders 61.

Figure 5:
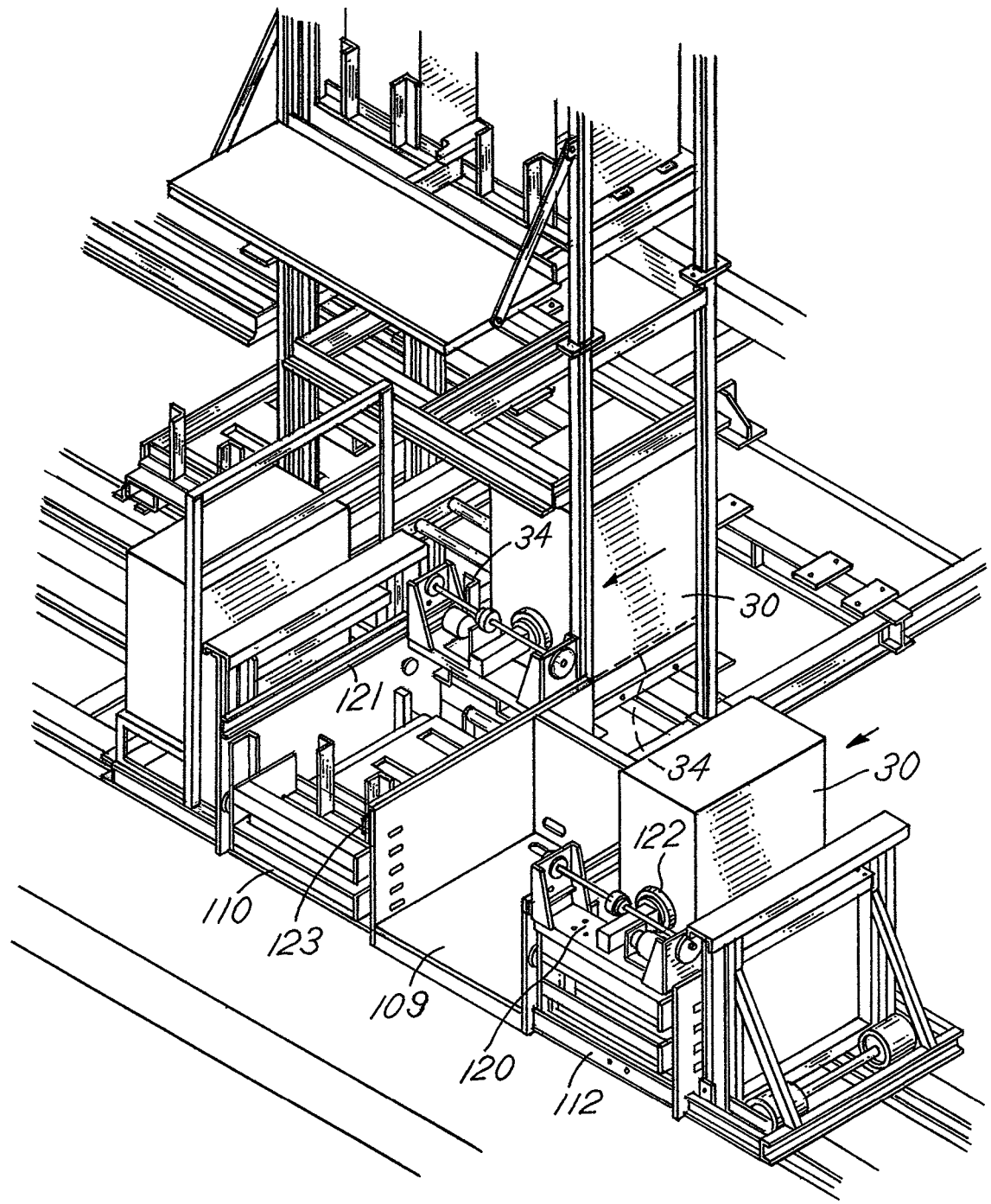
FIG. 5 is a partial isometric view of the system of FIG. 1 illustrating a battery exchanger.
Figure 5A:
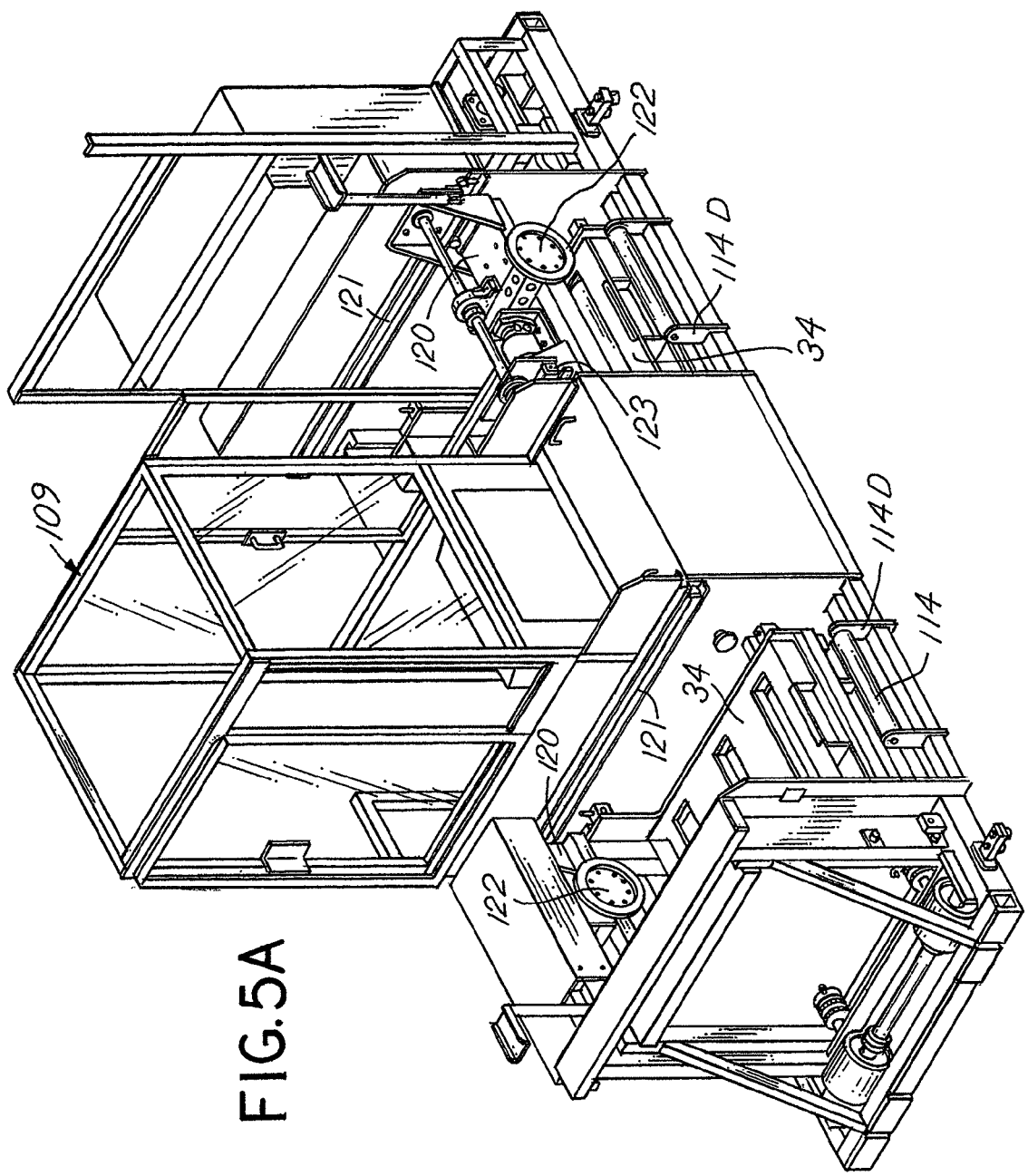
FIG. 5A is an isometric view of the battery exchanger of FIG. 5 as viewed from the opposite side thereof.

FIGS. 4B and 4C illustrate a pallet transfer rack which is associated with the lower or first level of the storage rack 60 and is designed to receive pallets 34 which are subsequently transferred to storage rack bays 39 such as depicted in FIG. 4A. Referring therefore to FIGS. 4B, 4C and 4D, the modular section includes vertical support members or beams 49 connected by horizontal beams 51 and cross members 58. The bays 38, 40 of the transfer bays or sections 38, 40 include an array of rollers, such as rollers 53, which may receive and support a pallet 34 transferred from an exchange bay 110 or 112 of the battery exchanger 36 depicted in FIG. 5. The upper section of the staging modular section depicted in FIGS. 4B, 4C and 4D comprise storage bays 39 as depicted and discussed with respect to FIG. 4A. The lower bays 38, 40, however, are transfer bays for transitioning the movement of pallet 34 supported batteries 30 to and from the exchanger 36 and storage bays 39.

The Transport Tower

The transport tower 52 comprises a vertical tower which rides along the horizontal rail 64 at the ground level and the second top rail 66 parallel to the ground level rail 64. Thus the tower 52 maintains a generally vertical position intermediate the racks 60, 62 and further includes an extendable forklift mechanism 50 which is designed to engage a pallet 34 and support the pallet on spaced forks 70, 72.

FIGS. 6, 7A, 7B, 7C, 8 and 9 depict in greater detail the center transport tower 52. The top rail 66 is held in position by crossing girders 69 which are used in assembly of the parallel sets of storage racks. Thus, the tower 52 maintains a generally vertical position intermediate the racks 60 and 62 and further includes the extendable forklift mechanism 50 which includes spaced forks 70, 72 to engage and support a pallet. The spaced forks 70 and 72 are supported on a carriage 78 which is attached to the tower 52 and which enables the forks 70, 72 to be rotated about the vertical axis of the tower 52. Additionally, the carriage 78 may elevate the forks 70, 72 or lower the forks 70, 72. That is, the carriage 78 moves vertically upwardly and downwardly to position the forks 70, 72 with a pallet 34 thereon appropriately for placement into the front side of one of the bays 39 of the storage racks 60 and 62.

The carriage 78 also includes a mechanism which enables horizontal movement of forks 70, 72 for engaging a pallet 34. The extendable forks 70 and 72 associated with the tower 52 thus, are sized and spaced so that they will uniquely engage and fit into channels 80, 82 of the pallets 34 described hereinafter, thereby enabling efficient acquisition and gripping of the pallets 34 and transport of those pallets 34 with a battery 30 thereon to a desired storage and charging bay 39 within the racks 60 and 62. The carriage 78 as well as the forks 70 and 72 are transported by the tower 52. Thus, the tower assembly provides for maximum movement about all axes so as to appropriately position a pallet 34 with a battery 30 thereon in the storage rack assembly. A typical tower assembly useful in the embodiment of the system is Model HK3000IRF Rotating Fork Storage and Retrieval Machine made by HK Systems, Inc., New Berlin, Wis.

Pallets

FIGS. 10, 10A, 10B and 10C depict the construction of a pallet 34 which is designed to support a battery 30. The pallets 34 are modular in size and each pallet 34 is constructed in substantially the same manner. Each pallet 34 is comprised of a first lateral side channel member 80 and a second parallel lateral side channel member 82. Channels 80, 82 are spaced, sized and shaped to receive forks such as forks 70 and 72 of the tower assembly previously described. The pallet 34 further includes an upper sheet metal plate 84 and a lower sheet metal plate 86 which are welded to and join the parallel spaced channels 80 and 82. Each pallet 34 further includes first, second and third transverse slots or passages 88, 90 and 92 in crossmembers or plates 84, 86 which extend transversely to and between the channels 80 and 82. An inside end of the pallet 34 includes a bracket 94 which serves as a stop for placement of a battery 30 upon the pallet 34 to thereby limit the movement of the battery 30 onto the pallet 34 and to facilitate positioning thereof on the pallet 34. The pallet 34 further includes a contact assembly 96 on the backside or end of the pallet. The contact assembly includes an insulating plate 98 which is attached between the channels 80 and 82 and supports contact brushes 46 and 48. The contact brushes 46 and 48 are connected respectively to lead wires 42 and 44 which, in turn, are designed to plug into the charge poles or contacts of a battery 30 supported on the top plate 84 of the pallet 34. The brushes 46 and 48 are configured or shaped so that when the pallet 34 slides into a charging station or charging bay 39, the brushes 46, 48, which are mounted on spring biased plate 96 biased by springs 108, will be biased into engagement with contacts 54, 56 respectively at the charging bay 39. These contacts are illustrated, for example, in FIG. 4A.

The Battery Exchanger

Figure 5E:
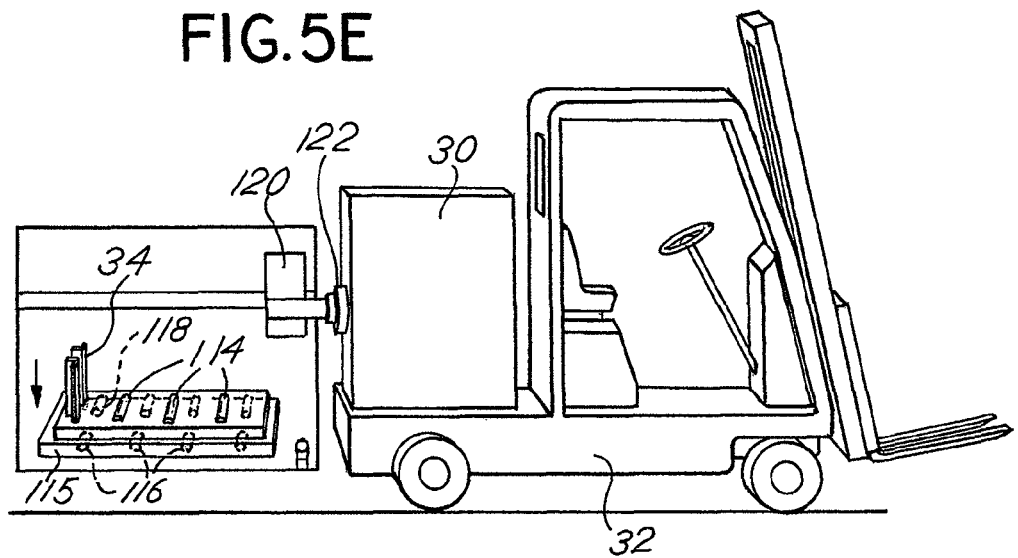
FIG. 5E is a schematic view of the operation of the battery exchanger for depicting the steps for removal of a battery from a forklift onto the battery exchanger.
Figure 5F:
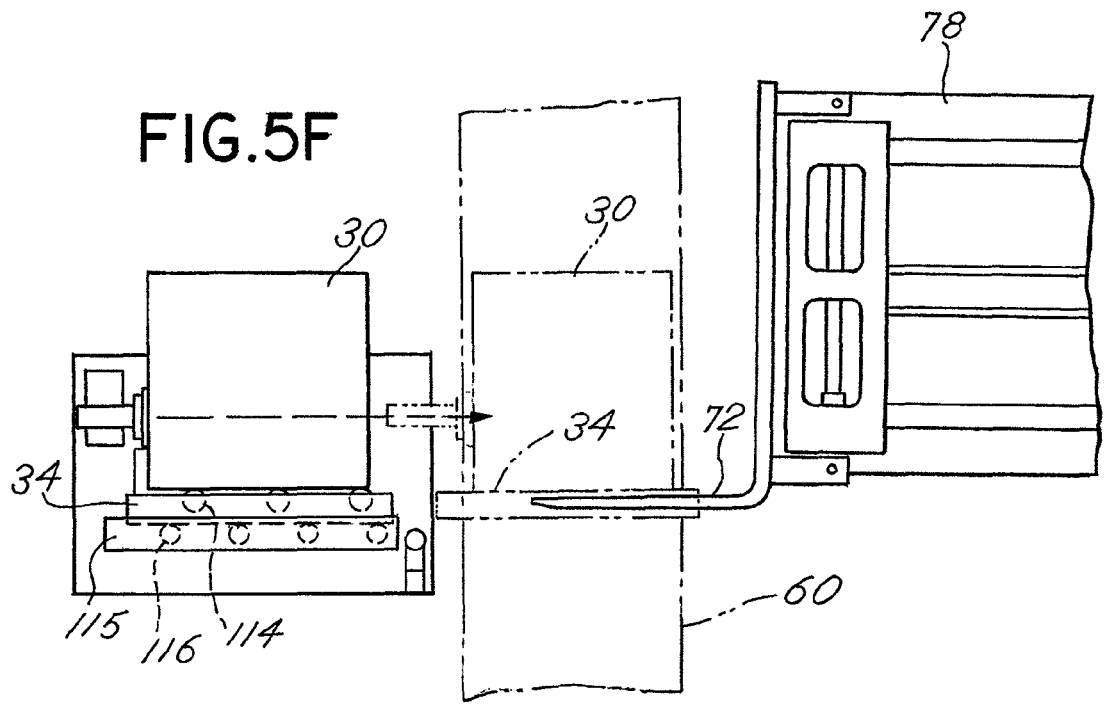
FIG. 5F is a further schematic view illustrating the steps in the transfer of the battery positioned on a pallet of the battery exchanger as depicted in FIG. 11 and subsequent transfer thereof into an exchanger bay followed by transfer into a storage or charging bay of the system.
Figure 6:
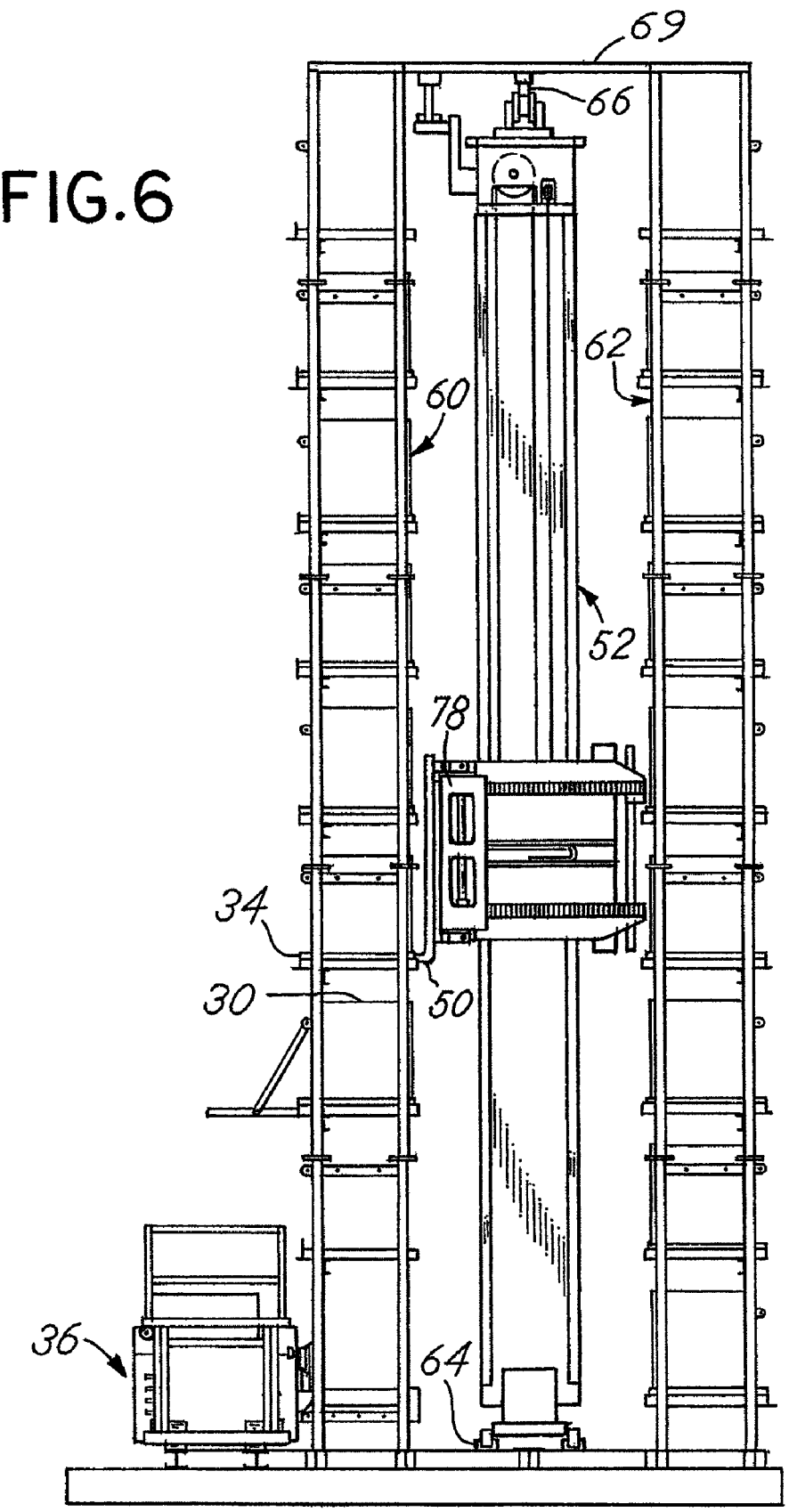
FIG. 6 is an end view of the system of FIG. 1 similar to FIG. 2 illustrating in further detail a vertical lift mechanism for transport of batteries into and out of the storage rack for the batteries.
Figure 7A:
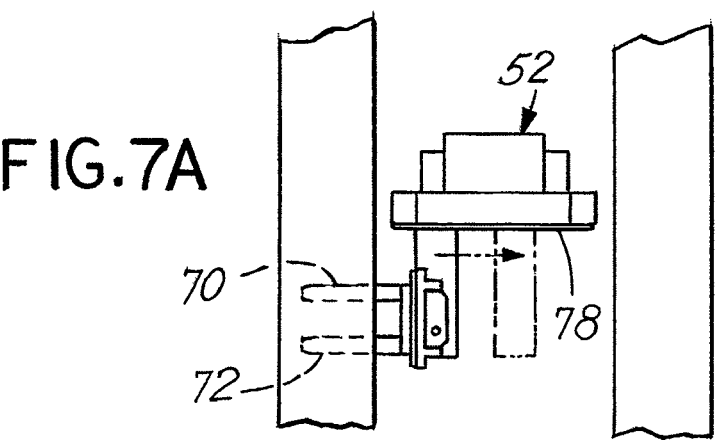
FIGS. 7A, 7B and 7C are a series of partial cutaway top plan views of the system illustrating the mechanism for movement of batteries from a center tower into and out of the battery storage rack.
Figure 7B:
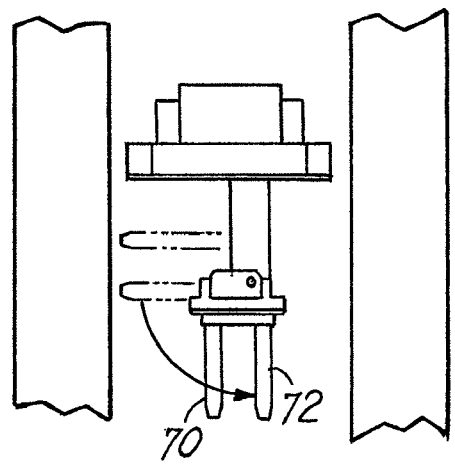
Figure 7C:
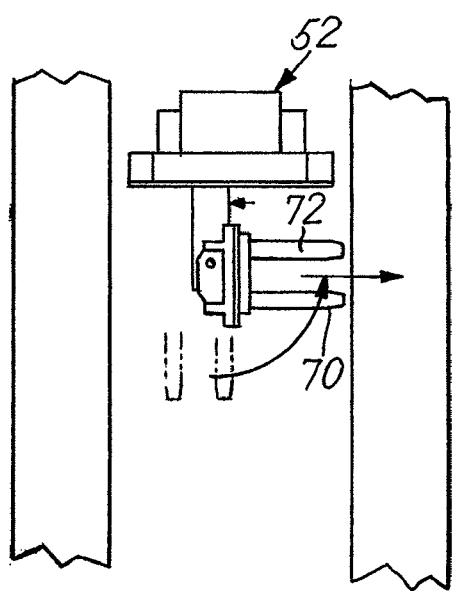

The battery or item exchanger 36 is disclosed, inter alia, in FIGS. 3, 4, 5, 5A-5D, and diagrammatic FIGS. 5E and 5F. The battery exchanger 36 is mounted on rails 104, 106 and is mounted to move parallel to the storage rack 60 and along the back side thereof. The purpose of the battery exchanger 36 is to remove uncharged batteries 30 from a vehicle 32 and to place recharged batteries 30 into a vehicle 32. Thus the battery exchanger 36 includes a control station 109 intermediate spaced first and second battery exchange bays 110, 112. Each bay 110, 112 includes a series of fixed rollers 114 which may project through the openings or slots 88, 90, 92 defined in a pallet 34. Further, each bay 110, 112 possesses sets of spaced side rollers 116, 118 mounted on a vertically moveable frame 115 to support and permit the movement of palette 34 into and out of a bay 110, 112. Thus in operation, when the battery exchanger 36 is aligned with a battery operated vehicle 32, frame 115 with side rollers 116, 118 supporting a pallet 34 will be vertically lowered to enable the fixed rollers 114 to fit through slots 88, 90, 92 of pallet 34 so that the pallet 34 will not move on rollers 116, 118. The pallet 34 is thus held in position by arms 114A, 114B 114C and 114D for the rollers 114 and the battery rollers 114 extend through the slots 88, 90, 92 between the lateral side girders 80, 82 of the pallet 34. A gripping mechanism 120 of the battery exchanger 36 will advance on channels 121, 123 in a bay 110, or 112 and engage the battery 30 in the vehicle 32. Typically, the engagement is effected by means of a vacuum suction plate 122. The battery 30 is thus pulled from the vehicle 32 onto the aligned rollers 114 in the transverse slots 88, 90, 92 in pallet 34.

Once the battery 30 is fully pulled onto the pallet 34, the frame 115 supporting the pallet 34 is elevated in the bay 110, 112 and the rollers 114 are disengaged from the slots 88, 90 and 92. The battery 30 is thus supported on pallet 34. The pallet 34 is now moveable on rollers 116, 118 but is retained in position by the gripping mechanism 120.

The battery exchanger 36 then moves along the pathway of the rails 104, 106. It approaches one of the transfer bays 38, 40. When aligned with a transfer bay 38, 40, the pallet 34 is then pushed on side rollers 116, 118 onto the rollers 121 in one of the transfer bays 38, 40.

Following transport into a transfer bay 38, 40, the pallet 34 with the uncharged battery 30 thereon, becomes accessible to the forks 70, 72 associated with the vertical transport tower 52. Thus the forks 70, 72 are extended and guided into the spaced channels 80, 82. The pallet 34 with the battery 30 thereon may thus be pulled from the transfer bay 38 or 40, and moved, in response to movement of the vertical tower 52, and the forks 70, 72 and carriage 78 associated therewith, for placement into any one of the storage and charging bays 39.

The reverse operation is effected by removal of a pallet 34 with a charged battery 30 thereon by means of the assembly including transport tower 50 and forks 70, 72. The pallet 34 with the charged battery 30 thereon is moved into one of the transfer bays 38 or 40. Once positioned in one of the transfer bays 38 or 40, the battery exchanger 36, and more particularly the vacuum suction and gripping mechanism 120, may be used to pull the entire pallet 34 into an exchange bay 110, 112 of the battery exchanger 36 onto rollers 116, 118 where it is retained for movement of the battery exchanger 36 along the side of the rack 60 on rails 104, 106. The battery exchanger 36 is then moved to a station adjacent a vehicle 32 requiring a battery 30. The pallet 34 is lowered so that the battery is supported by rollers 114 or arms 114A, 114B, 114C projecting through the slots 88, 90, 92. The pusher mechanism 120 may then push the battery 30 into the vehicle 32 where the contacts for the vehicle 32 are inserted into the battery contacts.

The battery exchanger 36 thus typically includes a first exchange bay 110 and a spaced second exchange bay 112, which may be aligned with transfer bays 38, 40. In this manner, a battery 30 may be withdrawn from a vehicle 32 once it is discharged and the exchanger 36 positioned in a manner which would then enable placement of a charged battery within the vehicle 32. The discharged battery is then transferred to a transfer bay 38 or 40 for subsequent transfer by the tower assembly or tower 50 to a charging bay 39. A newly charged battery 30 may be positioned in the empty exchanger station 110 or 112. Thus a higher degree of efficiency is achieved inasmuch as a discharged as well as a charged battery 30 may be moved simultaneously by means of the battery exchanger 36.

System Operation

In operation, the choice of a charged battery is programmable. An operator who desires to have a charged battery in a vehicle may operate the battery exchanger 36. That individual, however, would not typically know which battery is adequately charged. Thus, a program is associated with the choice of the battery which provides a first in, first out (FIFO) result to insure that a charged battery 30 is being exchanged for a discharged battery 30.

A typical programming system that may be incorporated in the embodiment disclosed in the "Guardian Battery Management System" made by BFL Associates, West Chicago, Ill. In practice, the battery exchanger 36 may be operated by the individual operating the vehicle that needs the battery. This simplifies the operation and utility of the exchanger 36 inasmuch as additional personnel are not required to effect the storage and charging of batteries, and the individual who requires a new battery 30 need not engage in attempting to locate a charged battery. Rather, the software associated with the operation of the system will insure that a charged battery is placed at a transfer bay 38, 40 and will be exchanged for a like uncharged battery provided from a vehicle.

While there has been set forth the preferred embodiment of the invention, it is to be understood that the invention is limited by the claims and equivalents thereof.

What is claimed is:

1. An industrial battery charging, storage, and handling system comprising, in combination:
   a first storage rack comprising an array of storage bays, each storage bay including a front entry opening and a support floor, said storage bays forming a first grid of vertical and horizontal rows, said first storage rack including bottom row first and second transfer bays, each said transfer bay having a front entry opening and a back entry opening, at least some of said storage bays positioned above said transfer bays in said grid;
   a second storage rack comprising an array of storage bays, each said second rack storage bays including a front entry opening and a support floor, said second rack storage bays forming a second grid of vertical and horizontal rows;
   said first storage rack and said second storage rack arranged generally parallel, and spaced from each other to define a passageway with the front entry openings of the first and second storage racks opposed and facing the passageway, at least some of said storage bays including battery charging terminals;
   a pallet transporter mounted in the passageway intermediate the spaced first and second storage racks, said transporter including a movable carriage capable of vertical and horizontal movement between the first and second storage racks and including a pallet support platform capable of horizontal movement into the front entry openings of the storage bays of said first and second storage racks and into the front entry opening of the transfer bay openings of the first storage rack; and
   a battery exchanger mechanism mounted for movement to a position opposite the back entry opening of said transfer bays, said battery exchanger mechanism moveable generally horizontally between said transfer bay back openings and a vehicle battery exchange station, said exchanger mechanism including first and second pallet battery exchange bays horizontally arrayed and alignable with the back entry openings of the transfer bays, said exchanger mechanism movable horizontally to align a battery exchange bay with a battery of a battery operated vehicle at said vehicle station and including a battery removal and support mechanism for removing a battery from a said vehicle at said vehicle station and placing thereof on a transfer pallet in one of said exchange bays, said exchanger mechanism movable horizontally to align one each of said exchange bays with a separate one of said transfer bays, said at least one exchange bay of said exchange mechanism further including a battery and pallet movement mechanism to transfer a said one of said battery and pallet from an exchange bay into a transfer bay through the back entry opening thereof, said one exchange bay sized to include a transfer pallet having a plurality of slots for receipt of battery support rollers in said one exchange bay, said one exchange bay including rollers mounted in said one exchange bay for movement into said pallet slots in said exchange bay to support rolling of a said battery transferred by said battery removal and support mechanism into said one exchange bay, said rollers being further mounted to disengage from said pallet slots to enable support of a said battery on said pallet in said one exchange bay.

2. The system of claim 1 wherein the transporter comprises a vertical support tower mounted on a horizontal track, said carriage mounted on the support tower for vertical and rotational movement about an axis of the tower.

3. The system of claim 1 wherein said exchange bays each include a battery and pallet movement mechanism for transferring a pallet horizontally from said exchange bay to an aligned transfer bay or a vehicle at said vehicle station.

4. The system of claim 1 wherein said transporter includes a fork support which is horizontally moveable and a pallet compatible with the fork support, said pallet separate from the fork support.

5. The system of claim 1 wherein said battery removal and support mechanism of said one exchange bay includes a gripping mechanism in said one exchange bay for engaging and moving said battery from said vehicle.

6. The system of claim 1 wherein said battery removal and support mechanism of said one exchange bay further includes a pallet support frame mounted for horizontal movement from said one exchange bay to a transfer bay.

7. The system of claim 5 wherein said battery removal and support mechanism of said one exchange bay further includes a pallet support frame mounted for horizontal movement from said one exchange bay to a transfer bay.

8. The system of claim 7 wherein each exchange bay includes a battery removal and support mechanism.

9. The system of claim 1 wherein said first and second exchange bays are separated horizontally by a control station.

10. The system of claim 5 wherein said battery removal and support mechanism of said one exchange bay includes a gripping mechanism in said one exchange bay for engaging and moving said battery from said vehicle.

11. An industrial battery storage and handling system comprising, in combination:
   a first storage rack comprising an array of storage bays, at least two selected storage bays including a front entry opening and a support floor, said storage bays forming a grid of vertical and horizontal rows, said storage rack including at least a first transfer bay and a second transfer bay, each said transfer bay having a front entry opening and a back entry opening;
   a generally vertical battery and pallet transport tower mounted for horizontal movement along the front entry openings, said tower including a battery and pallet carrier mounted for vertical movement and horizontal movement;
   a battery pallet sized for placement into a single storage bay with a battery supported by the support floor, said pallet including a support bed for battery support and electric charging contacts for connection to a battery supported on said pallet; and
   a battery exchanger including first and second exchange bays, said battery exchanger mounted on a track for horizontal movement, said battery exchanger further including a support bed for a pallet in at least one of said exchange bays alignable with the back entry opening of one of said transfer bays and to a vehicle station adjacent the storage rack, said battery exchanger further including a battery removal mechanism for moving a battery onto and off of a said pallet on the support bed, and onto and off of a vehicle at said vehicle station, said exchanger mechanism exchange bays horizontally arrayed and each said exchange bay alignable with the back entry openings of the transfer bays, said battery moving mechanism including a transfer pallet for support of a battery, said transfer pallet including a plurality of slots for receipt of battery support rollers, said rollers mounted in said one transfer bay for movement into said pallet slots to support rolling of a said battery transferred by said battery removal mechanism into said one exchange bay, said rollers being further mounted to disengage from said slots to enable support of a said battery on said pallet and said support bed in said one exchange bay.

12. The system of claim 11 wherein said pallet comprises a tubular channel and said pallet carrier includes a fork insertable into the channel.

13. The system of claim 11 including an exchanger track for guiding movement of the battery exchanger mechanism between the back entry openings of the transfer bay and said vehicle station.

14. The system of claim 11 wherein the battery pallet comprises first and second, spaced parallel channels, a platform supported by said channels, a first electric brush and a second electric brush, said brushes projecting from the platform and first and second battery leads electrically connected respectively to the first and second brushes, said channels configured for engagement by a fork lift.

15. The system of claim 14 wherein storage bays include a first and a second contact terminal for electrical contact with said first and second brushes, respectively.

16. The system of claim 11 further including a battery charging system including charging terminals for said storage bays.

17. The system of claim 16 further including a program controller for controlling the charging of a battery located on a pallet in a storage bay.

18. The system of claim 11 wherein said transport tower comprises a generally vertical tower having a fork lift, said tower and fork lift being independently movable.

19. The system of claim 18 wherein said pallet includes channels for receipt of said fork lift.

20. The system of claim 17 wherein said program controller prioritizes the charging, storage, and removal from storage of batteries in accord with a set protocol.

21. The system of claim 20 wherein the set protocol is FIFO.

* * * * *